US006557401B2

(12) United States Patent
Ito

(10) Patent No.: US 6,557,401 B2
(45) Date of Patent: May 6, 2003

(54) METHOD AND APPARATUS FOR DETECTING ABNORMALITIES IN FUEL SYSTEMS

(75) Inventor: Tokiji Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 93 days.

(21) Appl. No.: 09/829,950

(22) Filed: Apr. 11, 2001

(65) Prior Publication Data

US 2002/0046609 A1 Apr. 25, 2002

(30) Foreign Application Priority Data

Apr. 11, 2000 (JP) ....................................... 2000-109624
Jun. 22, 2000 (JP) ....................................... 2000-187345

(51) Int. Cl.[7] ............................................... G01M 15/00
(52) U.S. Cl. ....................................................... 73/118.1
(58) Field of Search ................................ 73/40.5, 49.7, 73/115, 116, 117, 117.2, 117.3, 118.1; 123/518, 519, 520, 521, 198

(56) References Cited

U.S. PATENT DOCUMENTS 5,333,589 A 8/1994 Otsuka
5,669,362 A 9/1997 Shinohara et al.
5,679,890 A 10/1997 Shinohara et al.
5,996,400 A * 12/1999 Noshioka et al. ............ 73/40.5
6,148,803 A * 11/2000 Majima et al. ............. 123/520
6,405,718 B1 * 6/2002 Yoshioka et al. ........... 123/520

* cited by examiner

*Primary Examiner*—Hezron Williams
*Assistant Examiner*—Monica D. Harrison
(74) *Attorney, Agent, or Firm*—Oliff & Berridge PLC

(57) ABSTRACT

A fuel vapor purge system is tested for abnormalities. The fuel vapor purge system includes a line that connects an intake passage of an engine to a fuel reservoir and a canister inlet valve. The fuel reservoir is sealed by closing the canister inlet valve after the engine is started when cold or before the engine is started. The pressure in the sealed reservoir is measured. The absolute value of the difference between the pressure in the reservoir and the atmospheric pressure is compared with a predetermined reference value. It is judged whether the reservoir is abnormal in accordance with the comparison. If it is determined that the reservoir is abnormal, negative pressure is applied from the air intake passage of the engine to the purge line. In this state, the fuel vapor purge line is tested for abnormalities.

14 Claims, 7 Drawing Sheets

METHOD AND APPARATUS FOR DETECTING ABNORMALITIES IN FUEL SYSTEMS

BACKGROUND OF THE INVENTION

The present invention relates to abnormality detection for fuel reservoirs, and, more particularly, to methods and apparatuses for detecting abnormalities in fuel reservoirs of fuel vapor purge systems.

Generally, a vehicle provided with a reservoir for volatile liquid fuel includes a fuel vapor purge system. A typical fuel vapor purge system supplies fuel vapor generated in the fuel reservoir to a canister. The fuel vapor is temporarily retained in the canister and is purged (discharged) from the canister to an intake passage of the engine at an appropriate timing. In many cases, an apparatus for abnormality detection is incorporated in the fuel vapor purge system to detect a leakage caused by a puncture or rupture. This makes the system more reliable.

A fuel vapor purge system provided with a typical abnormality detection apparatus includes at least:

(1) an atmospheric air inlet valve, which controls introduction of atmospheric air from an upstream section of the engine's intake passage to the canister;

(2) a purge control valve, which controls purging of fuel vapor from the canister to a downstream section of the intake passage;

(3) a differential pressure type reservoir pressure control valve, which supplies fuel vapor from the fuel reservoir to the canister if the difference between the pressure in the fuel reservoir and the pressure in the canister exceeds a predetermined level; and (4) a canister inlet valve (also referred to as "negative pressure supply valve"), which connects the canister to the fuel reservoir when necessary. In a communication passage that connects the fuel reservoir to the canister, a path that passes through the reservoir pressure control valve is parallel with a path that passes through the canister inlet valve.

The fuel vapor purge system initiates an abnormality detection procedure if two initial conditions are satisfied. More specifically, the first condition is that the engine coolant temperature must reach a procedure initiating level (for example, 80 degrees Celsius) when purging (introducing atmospheric air to the canister while discharging fuel vapor from the canister) is being performed. The second condition is that the pressure in the fuel reservoir must have been constant for a predetermined time period before the canister inlet valve is opened. When these conditions are met, the abnormality detection procedure is initiated.

First, the atmospheric air inlet valve is closed and the open/closed valve is opened. In this state, the fuel vapor purge system's evaporation path, which includes the canister and the fuel reservoir, is entirely depressurized through the purge control valve. When the pressure in the evaporation path is lowered to a predetermined level, which is relatively low, the purge control valve is closed to seal the evaporation path. In the sealed state, the pressure in the evaporation path rises as time elapses. It is thus judged whether the evaporation path has a leak caused by a puncture or a rupture according to the rate at which the pressure in the evaporation path rises from the predetermined, relatively low level.

However, this abnormality detection procedure for the fuel vapor purge system has the following problem.

When the two initial conditions are met, the atmospheric air inlet valve is closed while the canister inlet valve is opened, thus decreasing the pressure in the evaporation path. However, in this state, the pressure in the fuel reservoir is applied to the canister through the canister inlet valve, which is open. This increases the time required for the pressure in the entire evaporation path, which includes the fuel reservoir and the canister, to fall to the predetermined low level. In other words, the pressure in the entire evaporation path does not reach the predetermined low level immediately after the detection procedure is started. Accordingly, the first cycle of the abnormality detection procedure is delayed.

SUMMARY OF THE INVENTION

Accordingly, it is an objective of the present invention to provide a method for detecting an abnormality in a fuel reservoir of a fuel vapor purge system separately from the remainder of the system with an increased accuracy and at a relatively early stage before or immediately after starting of the engine, and an apparatus for performing abnormality detection in accordance with this method.

To achieve the foregoing and other objectives and in accordance with the purpose of the present invention, the invention provides a method for testing whether an abnormality exists in a fuel vapor purge system. The purge system has a line that connects an intake passage of an engine to a fuel reservoir and a canister inlet valve. The method includes sealing the fuel reservoir by closing the canister inlet valve after a cold start of the engine is performed or before the engine is started, measuring the pressure in the fuel reservoir in the sealed state, comparing the absolute value of the difference between the pressure in the fuel reservoir and the atmospheric pressure with a predetermined reference value, judging whether or not the fuel reservoir is abnormal in accordance with the result of the comparison, and performing an abnormality test on the fuel vapor purge system with negative pressure supplied from the intake passage to the line of the fuel vapor purge system if it is determined that the fuel reservoir has an abnormality.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A fuel vapor purge system for vehicles and an apparatus for detecting an abnormality in the fuel vapor purge system of an embodiment according to the present invention will now be described with the accompanying drawings. The apparatus includes an apparatus for detecting an abnormality in a fuel reservoir of the fuel vapor purge system.

Figure 1:
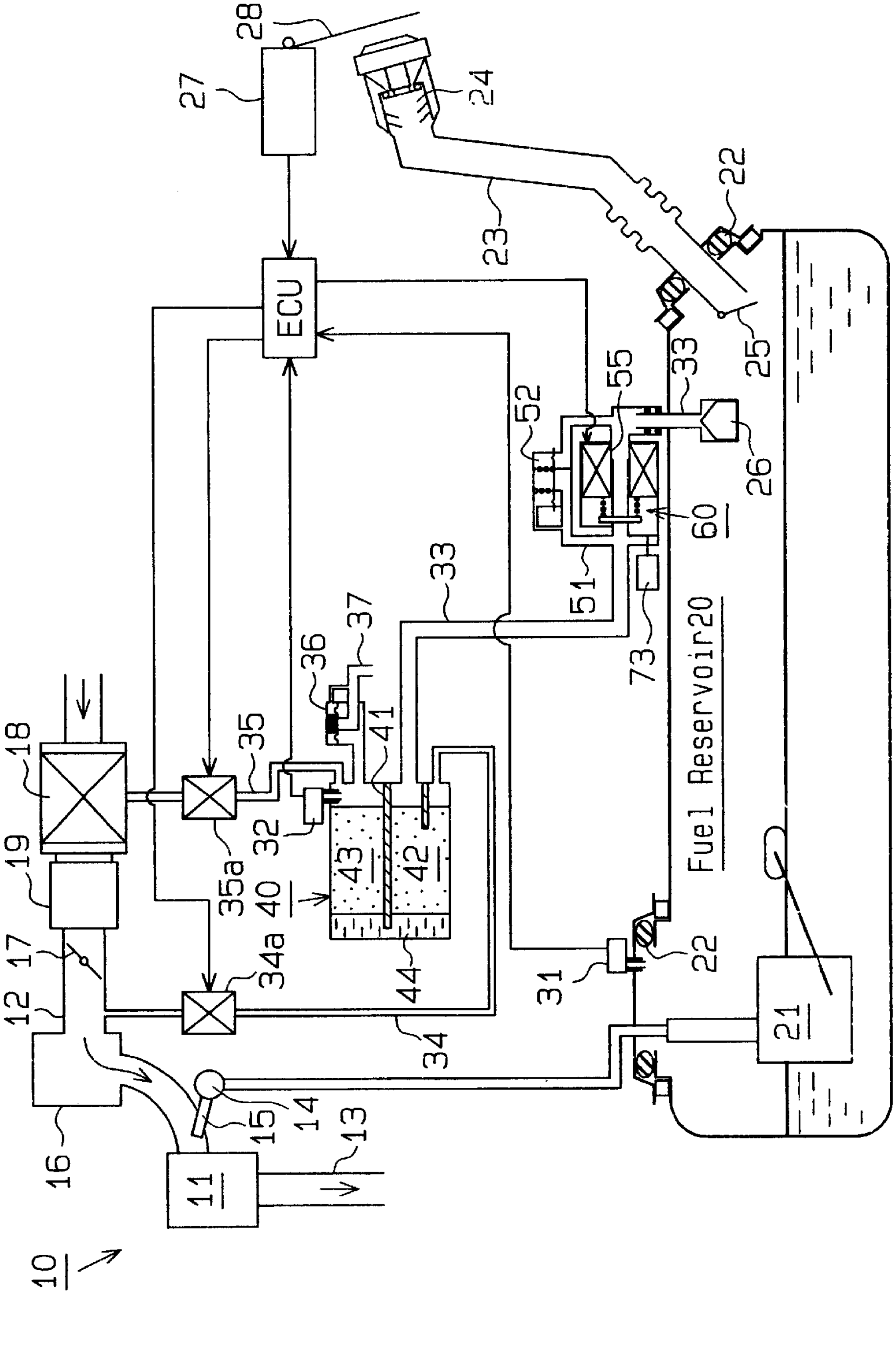
FIG. 1 is a schematic view showing a fuel vapor purge system and an abnormality detection apparatus for the fuel vapor purge system according to the present invention.

As shown in FIG. 1, an engine 10 has a combustion chamber 11, an intake passage 12, and a discharge passage 13. The engine 10 is supplied with fuel (for example, gasoline) from a fuel reservoir 20. More specifically, fuel is pumped from the fuel reservoir 20 by a fuel pump 21 and flows to a delivery pipe 14 through a fuel supply line. Fuel is then injected into the intake passage 12 by a fuel injecting valve 15. A surge tank 16 is provided in the intake passage 12. A throttle valve 17 is also provided in the intake passage 12 upstream of the surge tank 16. The throttle valve 17 varies the opening area of the intake passage 12 in relation to the degree of depression of an accelerator pedal (not shown). Further, an air cleaner 18 and an air-flow-meter 19 are located in the intake passage 12 upstream of the throttle valve 17. The air cleaner 18 cleans intake air before it is sent to the intake passage 12. The air-flow-meter 19 detects the amount of the intake air that is sent to the engine 10.

The fuel reservoir 20 is airtight, and FKM gaskets 22 are used for connecting the reservoir 20 to associated pipes. An inlet pipe 23 is connected to the fuel reservoir 20 and forms a fuel line that connects the exterior of the fuel reservoir 20 to the interior of the fuel reservoir 20. A flapper valve 24 is located at the outer end of the inlet pipe 23 and functions as a fuel inlet port. A check valve 25 is located at the inner end of the inlet pipe 23 and At prevents the fuel in the fuel reservoir 20 from flowing to the exterior of the reservoir 20. A first pressure sensor 31 is provided at an upper wall of the fuel reservoir 20. The first pressure sensor 31 measures, or detects, the pressure in the fuel reservoir 20 and the pressure in the region communicated with the reservoir 20. The pressures are detected relative to the atmospheric pressure. The fuel pump 21 is provided in the fuel reservoir 21. The fuel pump 21 and the first pressure sensor 31 are electrically connected to an electronic control unit (ECU). The fuel reservoir 20 includes a metallic body. Although not illustrated, the outer side of the reservoir body is coated with insulating material (for example, foamed polyurethane) and protecting material (for example, polypropylene).

As shown in FIG. 1, a fuel vapor purge system includes a canister 40. Fuel vapor produced in the fuel reservoir 20 is collected in the canister 40. The purge system also includes a passage that connects the canister 40 to the fuel reservoir 20, a plurality of lines that connect the canister 40 to an engine air intake system, and an electric control system that includes sensors and valves. The canister 40 accommodates an adsorbent (for example, activated charcoal) that adsorbs fuel vapor to temporarily store the substance in the canister 40. The adsorbent releases fuel vapor when exposed to a pressure lower than the atmospheric pressure. In the following description, a pressure lower than the atmospheric pressure is referred to as "negative pressure", and a pressure higher than the atmospheric pressure is referred to as "positive pressure".

The canister 40 is connected to the fuel reservoir 20 through a vapor passage 33 and to the intake passage 12 through a purge line 34. Also, the canister 40 is connected to the air cleaner 18 of the intake passage 12 through an atmospheric air inlet line 35. Further, the canister 40 is exposed to atmospheric air (fresh air) through an atmospheric air valve (also referred to as a "drain valve") 36 and an atmospheric air outlet line 37. An end of the vapor passage 33 projects in the interior of the fuel reservoir 20. A float valve (also referred to as a "roll-over valve") 26 is attached to the projecting end of the vapor passage 33. The float valve 26 detects whether the fuel reservoir 20 is full and seals the fuel reservoir 20 in a rolled-over state.

The purge line 34 purges (discharges) fuel vapor from the canister 40 to the intake passage 12 of the engine 10. A purge control valve **34*a* is located in the purge line 34. The purge control valve 34*a* is, for example, an electromagnetic valve or a vacuum switching valve (VSV). The atmospheric air inlet line 35 introduces atmospheric air (fresh air) to the canister 40. An atmospheric air inlet valve (also referred to as a "block valve") 35*a* is located in the atmospheric air inlet line 35. The atmospheric air inlet valve 35*a* is, for example, an electromagnetic valve or a vacuum switching valve (VSV). The atmospheric air valve 36 has a diaphragm type valve body. One side of the valve body receives the pressure in the canister, while the other side receives atmospheric pressure. The valve body opens the atmospheric air valve 36 when the pressure in the canister 40 reaches a predetermined level of positive pressure. This discharges excess air from the canister 40 to the atmospheric air outlet line 37**.

A partition 41 divides the interior of the canister 40 into a first adsorbent chamber 42 and a second adsorbent chamber 43. Each adsorbent chamber 42, 43 accommodates the adsorbent (activated charcoal). The first and second adsorbent chambers 42, 43 are connected to each other through an air-permeable filter 44 at a corresponding side of the canister 40. The first adsorbent chamber 42 is connected to the fuel reservoir 20 through the vapor passage 33. The atmospheric air inlet line 35 and the atmospheric air valve 36 are connected to the second adsorbent chamber 43. The purge line 34 connects the first adsorbent chamber 42 to a section of the intake passage 12 downstream of the throttle valve 17. That is, if the purge control valve **34*a* is open, the first adsorbent chamber 42 is connected to the intake passage 12. If the purge control valve 34*a* is closed, the first adsorbent chamber 42 is disconnected from the intake passage 12. More specifically, fuel vapor flows from the fluid reservoir 20 to the canister 40 through the vapor passage 33 and is adsorbed by the adsorbent in the first adsorbent chamber 42. The fuel vapor is thus temporarily stored in the canister 40. The fuel vapor is eventually discharged from the canister 40 to the intake passage 12 through the purge line 34. Further, even if the atmospheric air valve 36 opens to discharge excess air from the canister 40 to the exterior of the canister 40 through the atmospheric air discharge line 37, fuel vapor is substantially completely adsorbed by the adsorbent of the first or second adsorbent chamber 42, 43, when introduced to the canister 40. The fuel vapor thus remains in the canister 40 and does not leak to the exterior through the atmospheric air discharge line 37**.

The canister 40 includes a second pressure sensor 32. The second pressure sensor 32 is exposed to a vacant area of the second adsorbent chamber 43 that is not filled with the adsorbent. The second pressure sensor 32 thus detects the pressure in the canister 40. The pressure is detected as a relative value to the atmospheric pressure. The second pressure sensor 32 is electrically connected to the ECU.

Figure 2:
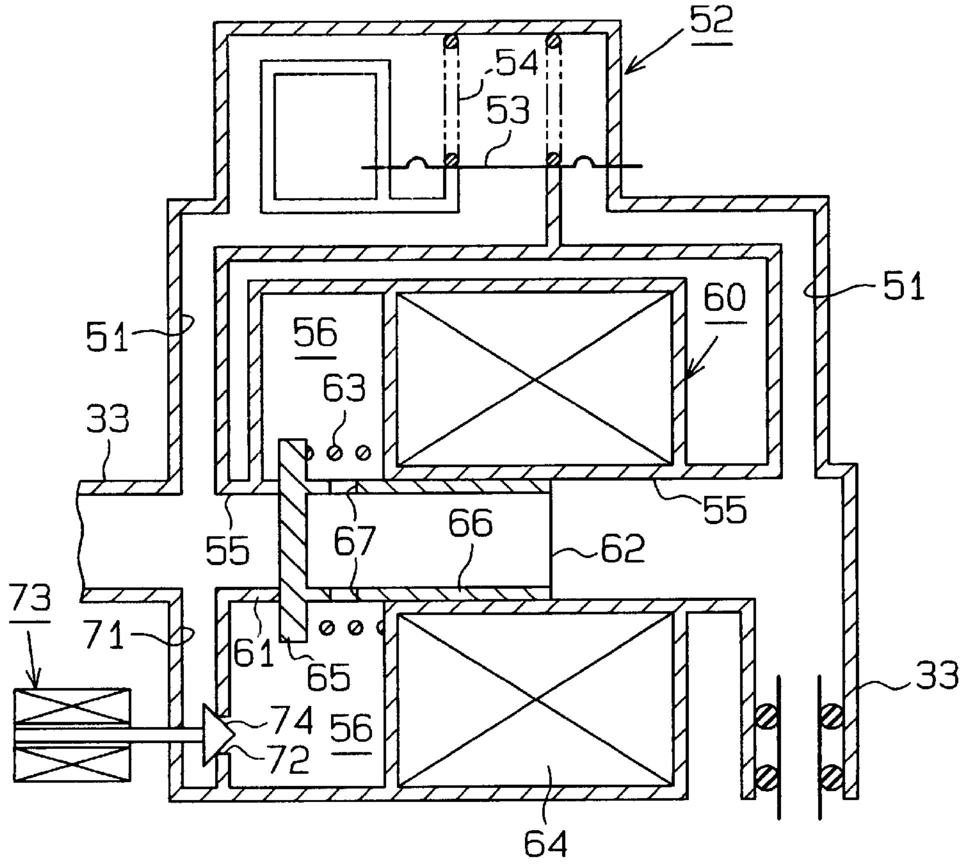
FIG. 2 is an enlarged view showing a portion of FIG. 1 in a state in which a section of a passage that connects the fuel reservoir to the canister is closed.

As shown in FIGS. 1 and 2, the purge line 33, which connects the fuel reservoir 20 to the canister 40, includes three branches. Each branch includes a valve mechanism that has a specific function. The branches are parallel in the is purge line 33.

More specifically, a first branch of the vapor passage 33 includes a main bypass 51 and a reservoir pressure control valve 52. The reservoir pressure valve 52 is located in the main bypass 51. An end of the main bypass 51 is connected to the canister 40, and the other is connected to the float valve 26. The reservoir pressure control valve 52 is a diaphragm type differential pressure valve and is substantially identical to the atmospheric air valve 36. That is, the reservoir pressure control valve 52 has a diaphragm type valve body 53 and a coil spring 54. The coil spring 54 urges the valve body 53 to close the reservoir pressure control valve 52. The side of the valve body 53 that contacts the coil spring 54 receives the pressure in the canister 40. In contrast, a substantial area of the opposite side of the valve body 53 receives the pressure in the fuel reservoir 20. The pressure at which the reservoir pressure control valve 52 opens depends on the force of the coil spring 42 and the flexibility of the valve body 53. That is, if the pressure in the fuel reservoir 20 is greater than the pressure in the canister 40 by more than a predetermined margin, the reservoir pressure control valve 52 opens to send fuel vapor from the fuel reservoir 20 to the canister 40 through the first branch of the vapor passage 33.

Figure 3:
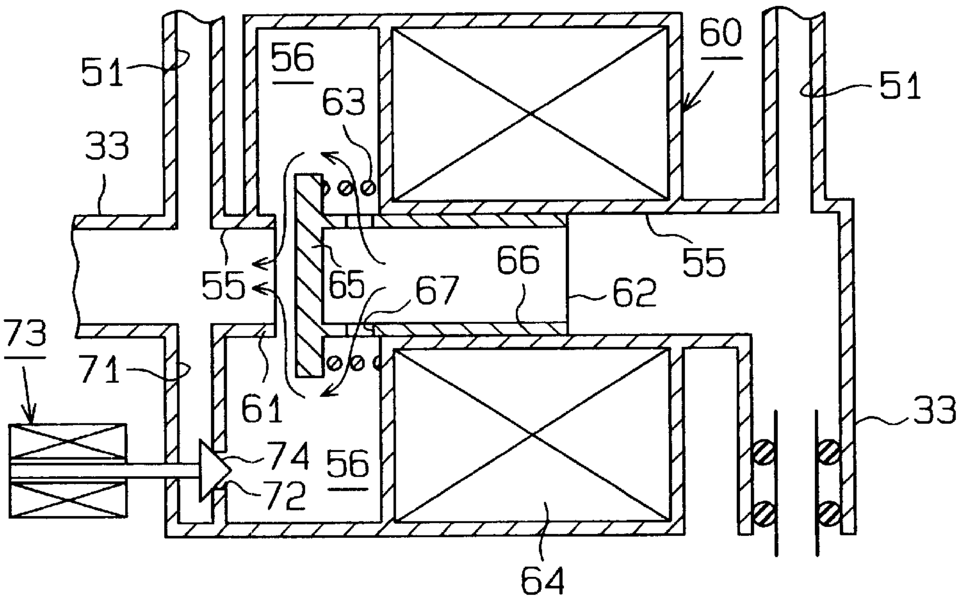
FIG. 3 is an enlarged view showing a portion of FIG. 1 in a state in which a section of a passage that connects the fuel reservoir to the canister is open.

A second branch of the vapor passage 33 includes an auxiliary bypass 55 and a fuel supply valve 60. The fuel supply valve 60 is located in the auxiliary bypass 55. The diameter of the auxiliary bypass 55 is larger than that of the main bypass 51. The auxiliary bypass 55 is normally closed by the fuel supply valve 60. That is, the auxiliary bypass 55 opens to connect the fuel reservoir 20 to the canister 40 only when a certain condition is satisfied. As shown in FIGS. 2 and 3, the auxiliary bypass 55 is separated into a pair of sections (with a valve seat 61 formed by an end of one separated section). A communication chamber 56 is formed between the two separated sections of the auxiliary bypass 55.

The fuel supply valve 60 includes the valve seat 61, a movable body 62, a coil spring 63, and an electromagnetic coil 64. The valve seat 61 is formed by the end of one separated section of the auxiliary bypass 55. The movable body 62 slides within the auxiliary bypass 55. The coil spring 63 urges the movable body 62. The electromagnetic coil 64 is wound around the outer wall of the auxiliary bypass 55, which supports the movable body 62. The electromagnetic coil 64 is supplied with electric current through a control procedure of the ECU. The movable body 62 moves between a closed position (see FIG. 2) and an open position (see FIG. 3). When the movable body 62 is located at the closed position, the movable body 62 contacts the valve seat 61. When the movable body 62 is located at the open position, the movable body 62 is separated from the valve seat 61. The movable body 62 includes a disk-like valve body 65 and a cylinder 66. The valve body 65 contacts the valve seat 61 or moves away from the valve seat 61 in accordance with the movement of the movable body 62. The cylinder 66 projects from the upstream side of the valve body 65, which is opposite to the side that contacts the valve seat 61. The outer periphery of the cylinder 66 contacts the inner wall of the auxiliary bypass 55 to substantially seal the space between the cylinder 66 and the inner wall of the bypass 55. This minimizes gas leakage between the cylinder 66 and the inner wall of the auxiliary bypass 55. A plurality of communication holes 67 extend radially through the cylinder 66. Each communication hole 67 constantly connects the communication chamber 56 to the interior of the cylinder 66 (the interior of the auxiliary bypass 55), regardless of the position of the movable body 62 within its movement range.

The coil spring 63 normally urges the movable body 62 toward the valve seat 61. The valve body 65 thus contacts the valve seat 61 to close the auxiliary bypass 55 as long as no current is supplied to the electromagnetic valve 64. When the force resulting from different pressures on opposite sides of the valve body 65 is higher than and opposite to the force of the spring 63, the valve 60 opens. This prevents the pressure in the fuel reservoir 20 from becoming excessively negative. The movable body 62 is made of a magnetic material. When the electromagnetic coil 64 is supplied with electric current to produce electromagnetic force, the movable body 62 moves to the open position of FIG. 3 against the force of the coil spring 63. The valve body 65 is thus separated from the valve seat 61 to open the fuel supply valve 60. Accordingly, the separated sections of the auxiliary bypass 55 are connected through the space between the valve seat 61 and the valve body 65, the communication chamber 56, and the communication holes 67. In this manner, the second branch of the vapor passage 33 connects the fuel reservoir 20 to the canister 40. In other words, the fuel supply valve 60 is a canister inlet valve that operates depending on the current supply to the electromagnetic coil 64.

A third branch of the vapor passage 33 includes a pressure equilibration line 71, the communication chamber 56, the communication holes 67, and a pressure releasing valve 73. A valve hole 72 extends through a partition between the pressure equilibration line 71 and the communication chamber 56. The pressure releasing valve 73 selectively opens and closes the valve hole 72. The valve hole 72 is normally closed by a valve body 74 of the pressure releasing valve 73. The pressure releasing valve 73 is electrically connected to the ECU. The ECU selectively opens and closes the pressure releasing valve 73. If the first pressure sensor 31 detects that the pressure in the fuel reservoir 20 is very low with respect to the atmospheric pressure (that the pressure in the fuel reservoir 20 is excessively negative), the ECU operates the valve body 74 of the pressure releasing valve 73 to open the valve hole 72. Accordingly, the third branch of the vapor passage 33 connects the fuel reservoir 20 to the canister 40 and the region connected to the canister 40. As a result, the pressure in the fuel reservoir 20 is equilibrated with the pressure in the canister 40 and the pressure in the region connected to the canister 40. The pressure in the fuel reservoir 20 is thus increased. In this state, if the atmospheric air inlet valve 35*a* is open, the pressure in the fuel reservoir 20 is raised to the atmospheric pressure. In other words, the pressure releasing valve 73 functions as a relief valve, which returns vapor or air from the canister 40 to the fuel reservoir 20. This prevents the pressure in the fuel reservoir 20 from becoming excessively negative.

In this embodiment, if the fuel supply valve 60 is opened when the purge control valve 34*a* is open to apply negative pressure to the canister 40, the fuel reservoir 20 is connected to the vapor passage 33, the canister 40, and the purge line 34. In this embodiment, the fuel reservoir 20, the vapor passage 33, the canister 40, and the purge line 34 are defined as an evaporation path of the fuel vapor purge system.

Figure 4:
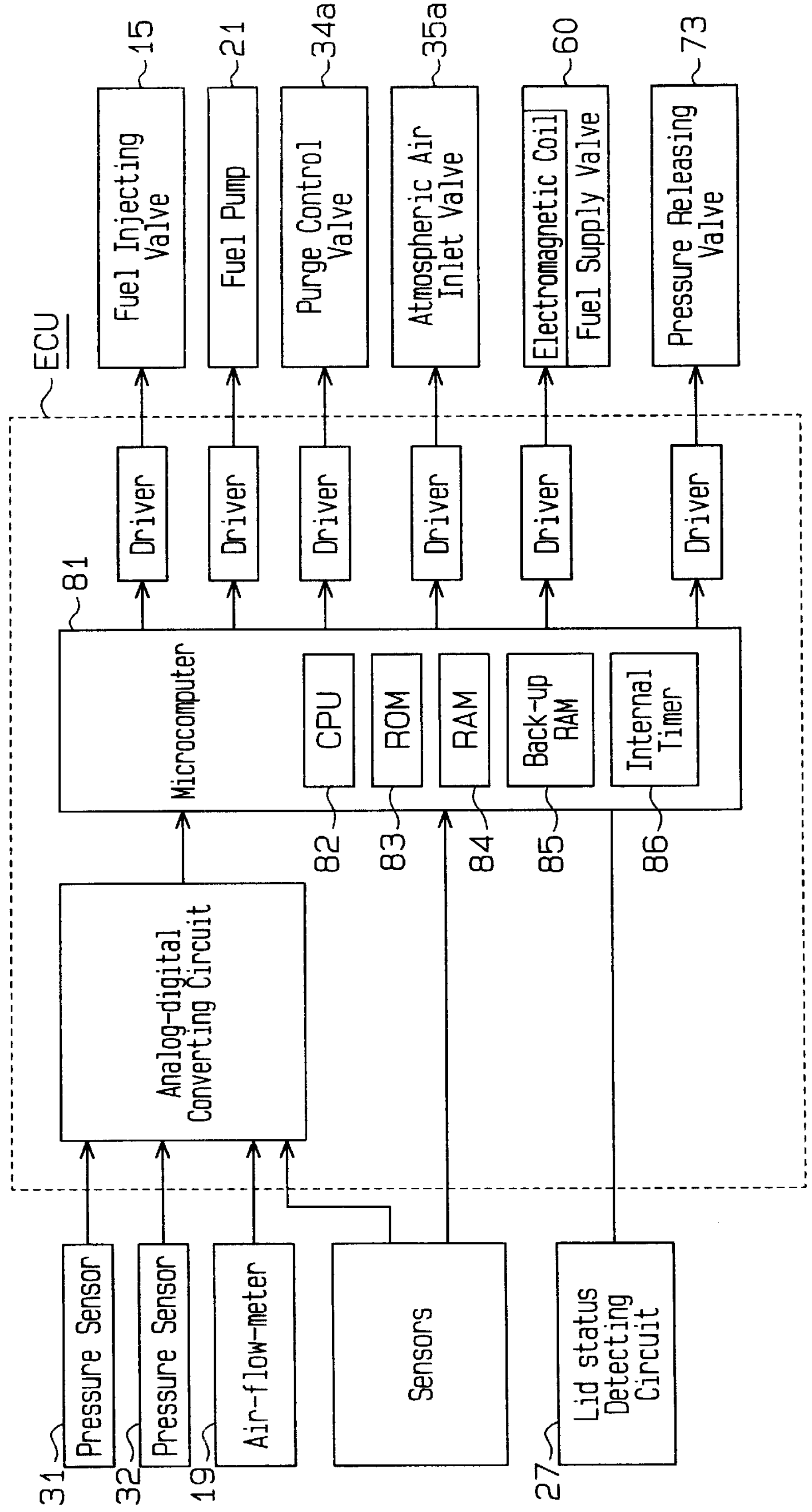
FIG. 4 is a block diagram schematically showing a control device for performing an abnormality detection procedure according to the present invention.

As described, the engine 10 and the fuel vapor purge system are controlled by the ECU, which functions as an engine control system and a test control system. As shown in FIG. 4, the ECU has a microcomputer 81 that executes various procedures for controlling the engine 10 and detecting a leakage in the evaporation path of the fuel vapor purge system, which includes the fuel reservoir 20. The microcomputer 81 includes a central processing unit (CPU) 82, a read only memory (ROM) 83, a random access memory (RAM) 84, a back-up random access memory (back-up RAM) 85, and an internal timer 86. The CPU 82 executes various computations. The ROM 83 stores various programs for controlling the engine 10 and detecting a leakage in the fuel vapor purge system. The RAM 84 is a volatile, freely readable and writeable memory. The back-up RAM 85 is a non-volatile, freely readable and writeable memory. The back-up RAM 85 is backed up by a battery to maintain the stored content even when the engine 10 is stopped.

As shown in FIG. 4, the fuel injection valve 15, the fuel pump 21, the purge control valve 34*a*, the atmospheric air inlet valve 35*a*, the fuel supply valve 60, and the pressure releasing valve 73 are connected to the output of the microcomputer 81 through the associated drivers.

The first and second pressure sensors 31, 32 and the air-flow-meter 19 are connected to the input of the microcomputer 81 through an analog/digital converting circuit. Also, various sensors are connected directly or indirectly to the input of the microcomputer 81. The sensors include an engine coolant temperature sensor, an engine speed sensor, and a cylinder identifying sensor. That is, the sensors acquire information necessary for controlling the operation of the engine 10. Further, as shown in FIGS. 1 and 4, a lid status detecting circuit 27 is connected to the input of the microcomputer 81.

As shown in FIG. 1, a lid (a fuel lid) 28 is located in the vicinity of the fuel inlet port (or the flapper valve 24). If the fuel lid 28 is opened to open the fuel inlet port, the lid status detecting circuit 27 sends a signal to the ECU, thus indicating that the lid 28 is open. When receiving the signal, the ECU supplies electric current to the electromagnetic coil 64, thus opening the fuel supply valve 60. Air or vapor thus escapes from the fuel reservoir 20 when fuel is supplied to the fuel reservoir 20. If the fuel lid 28 is closed to close the fuel inlet port, the ECU stops the current supply to the electromagnetic valve 64, thus closing the fuel supply valve 60. Further, the pressure at which the reservoir pressure control valve 52 opens is relatively high. The reservoir pressure control valve 52 thus remains closed, regardless of the pressure increase in the fuel reservoir 20 when fuel is supplied to the reservoir 20.

The ECU functions as an engine control device for controlling fuel injection or air/fuel ratio variation in accordance with information from the sensors. The ECU operates to selectively open and close the purge control valve 34*a*, the atmospheric air inlet valve 35*a*, the fuel supply valve 60, and the pressure releasing valve 73, according to the signals generated by the first and second pressure sensors 31, 32. In this manner, the ECU detects abnormalities in the fuel vapor purge system, which includes the duel reservoir 20. That is, the ECU also functions as a test control device.

(Operation of the Fuel Vapor Purge System)

If fuel vapor is produced in the fuel reservoir 20 and the pressure generated by the vapor exceeds a predetermined level, the reservoir pressure control valve 52 opens. In this state, fuel vapor flows from the fuel reservoir 20 to the canister 40. The fuel vapor is adsorbed by the adsorbent in the canister 40 and is temporarily stored in the canister 40. If the coolant temperature of the engine 10 reaches a predetermined purge initiating level (for example, eight degrees Celsius), the ECU opens the purge control valve 34*a* and the atmospheric air inlet valve 35*a*. Accordingly, negative pressure is applied from the intake passage 12 to the canister 40 through the purge line 34, and fresh air enters from the air cleaner 18 to the canister 40 through the atmospheric air inlet line 35. As a result, the adsorbent in the canister 40 releases fuel vapor, and the fuel vapor is purged to the intake passage 12 through the purge line 34.

(Leakage Detection in the Evaporation Path of the Fuel Vapor Purge System)

As described, the fuel reservoir 20 is air tight, and the fuel supply valve 60 is closed when fuel is not supplied to the fuel reservoir 20. Accordingly, abnormality detection for the fuel reservoir 20 is performed separately from abnormality detection for the remainder of the evaporation path, which includes the vapor passage 33, the canister 40, and the purge line 34. Hereinafter, the vapor passage 33, the canister 40, and the purge line 34 will be referred to as a "canister line".

Figure 5:
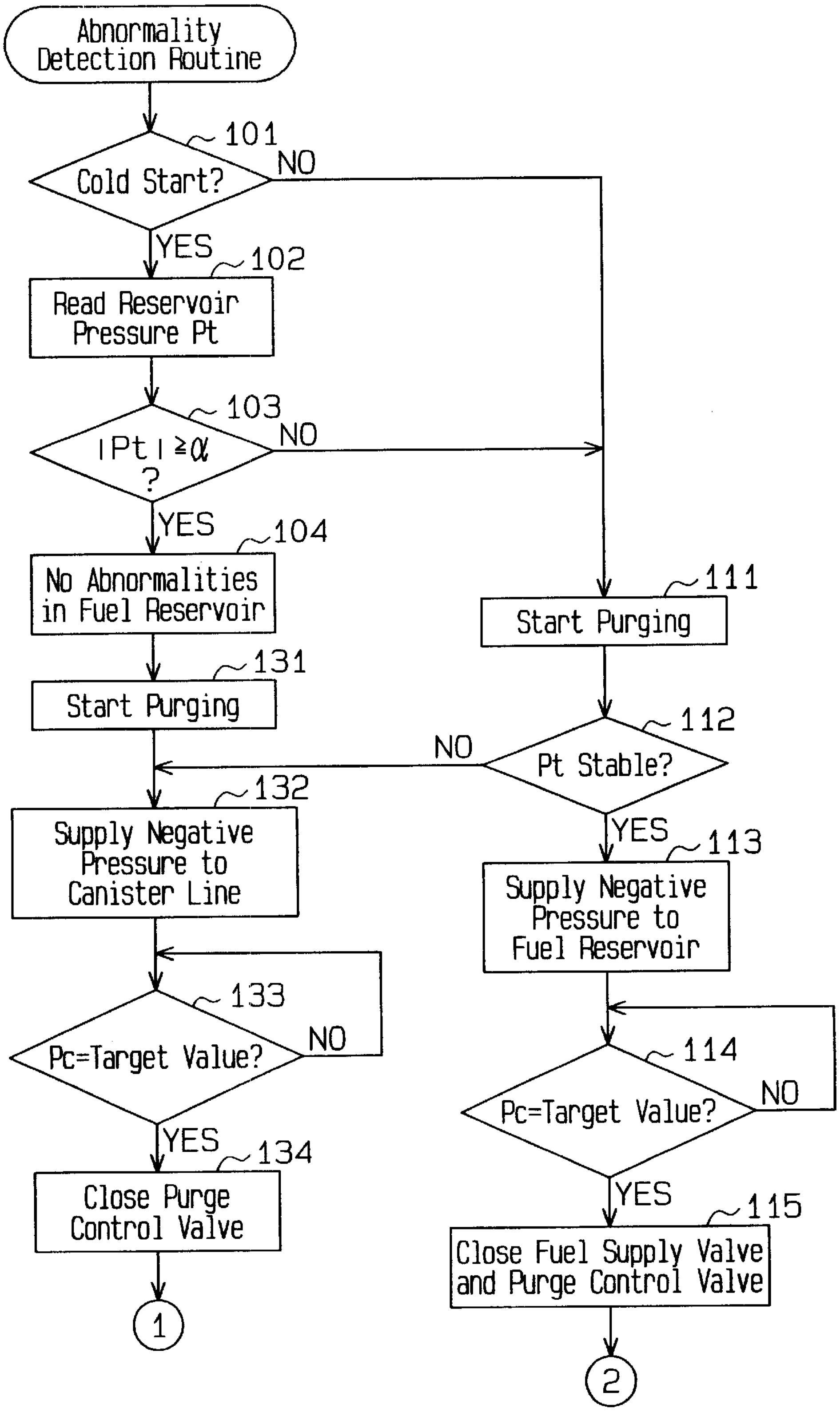
FIG. 5 is a flowchart schematically showing part of the abnormality detection procedure for a fuel reservoir.
Figure 6:
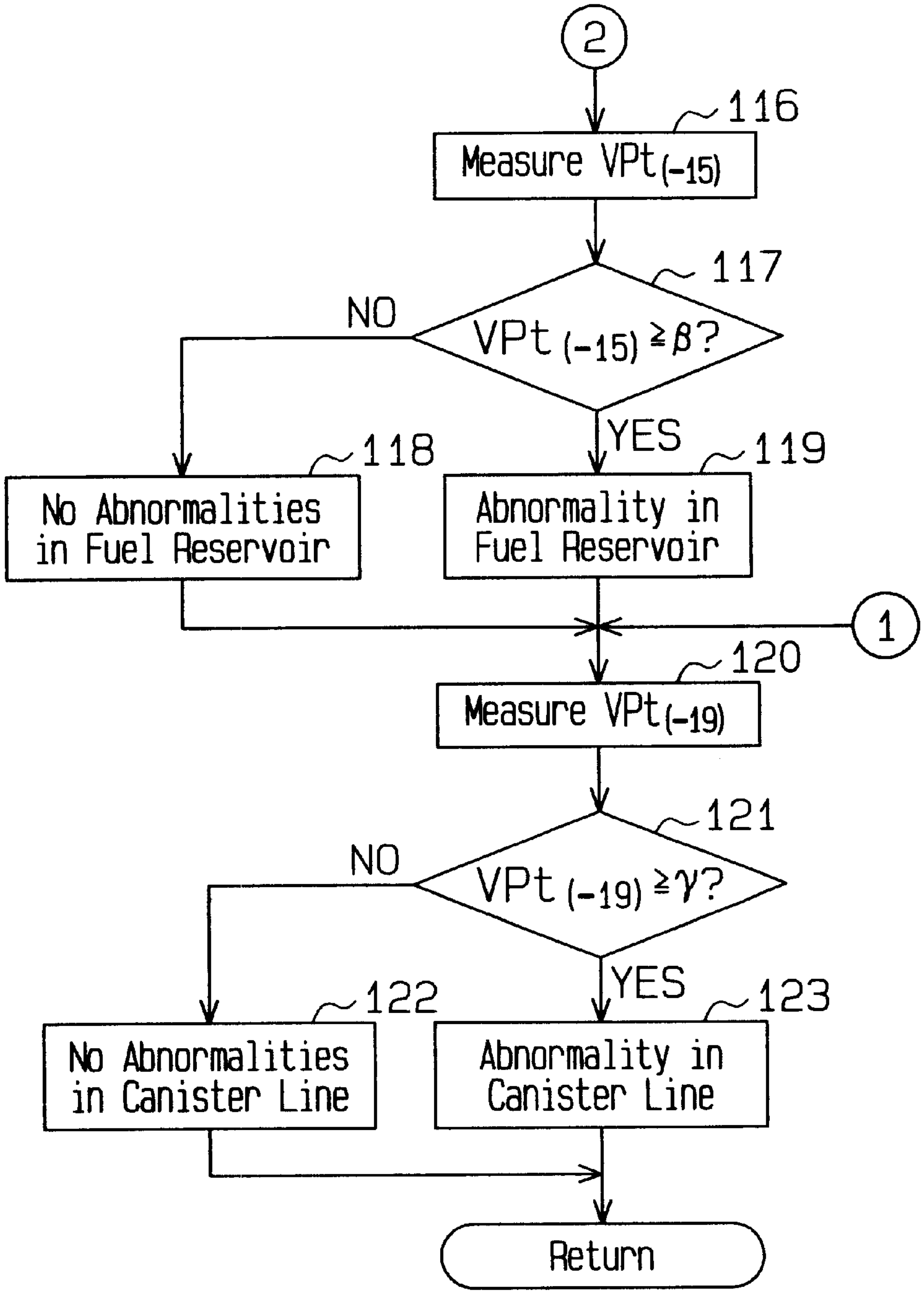
FIG. 6 is a flowchart schematically showing the remainder of the abnormality detection procedure for the fuel reservoir.

An abnormality detection routine for the evaporation path in the fuel vapor purge system of this embodiment is shown in FIGS. 5 and 6. The routine is performed by the ECU at predetermined time intervals (for example, every twenty milliseconds to every several hundreds of milliseconds) as a periodic interruption procedure.

When the periodic interruption procedure is executed, the ECU judges whether the engine 10 has been started when cold at step 101. More specifically, the ECU judges whether the engine coolant temperature is lower than a predetermined level (for example, 35 degrees Celsius) while the ignition switch is in a turned-on state. If the coolant temperature is lower than the predetermined level (the judgement of step 101 is positive), the ECU determines that the engine 10 was cold when started. Next, at step 102, the ECU reads the reservoir pressure Pt, or the pressure in the fuel reservoir 40 from the first pressure sensor 31. If the judgement of step 101 is negative, the ECU determines that the engine 10 was warm when started. In this case, the ECU proceeds to step 111 without performing step 102.

Subsequently, at step 103, the ECU judges whether the absolute value of the reservoir pressure Pt is equal to or greater than a predetermined reference value $\alpha$ ($\alpha>0$). That is, if the reservoir pressure Pt is positive, the ECU judges whether the reservoir pressure Pt is equal to or greater than the reference value $\alpha$. If the reservoir pressure Pt is negative, the ECU judges whether or not the reservoir pressure Pt is equal to or smaller than the value $-\alpha$. If the judgement of step 103 is positive, the difference between the reservoir pressure Pt and the atmospheric pressure is $\alpha$ or greater. That is, if the outcome of step 103 is positive, the fuel reservoir 20 is substantially airtight. In this case, the ECU determines that there are no abnormalities in the fuel reservoir 20 such as a puncture or rupture (at step 104). Further, the reference value $\alpha$ may be selected as a relatively large value to increase the reliability of the positive judgement confirmed in steps 103 and 104. However, even if the judgement of step 103 is negative, the fluid reservoir 20 does not necessarily have an abnormality such as a puncture or rupture. Thus, in this case, the ECU executes step 111 and the subsequent steps.

Figure 7:
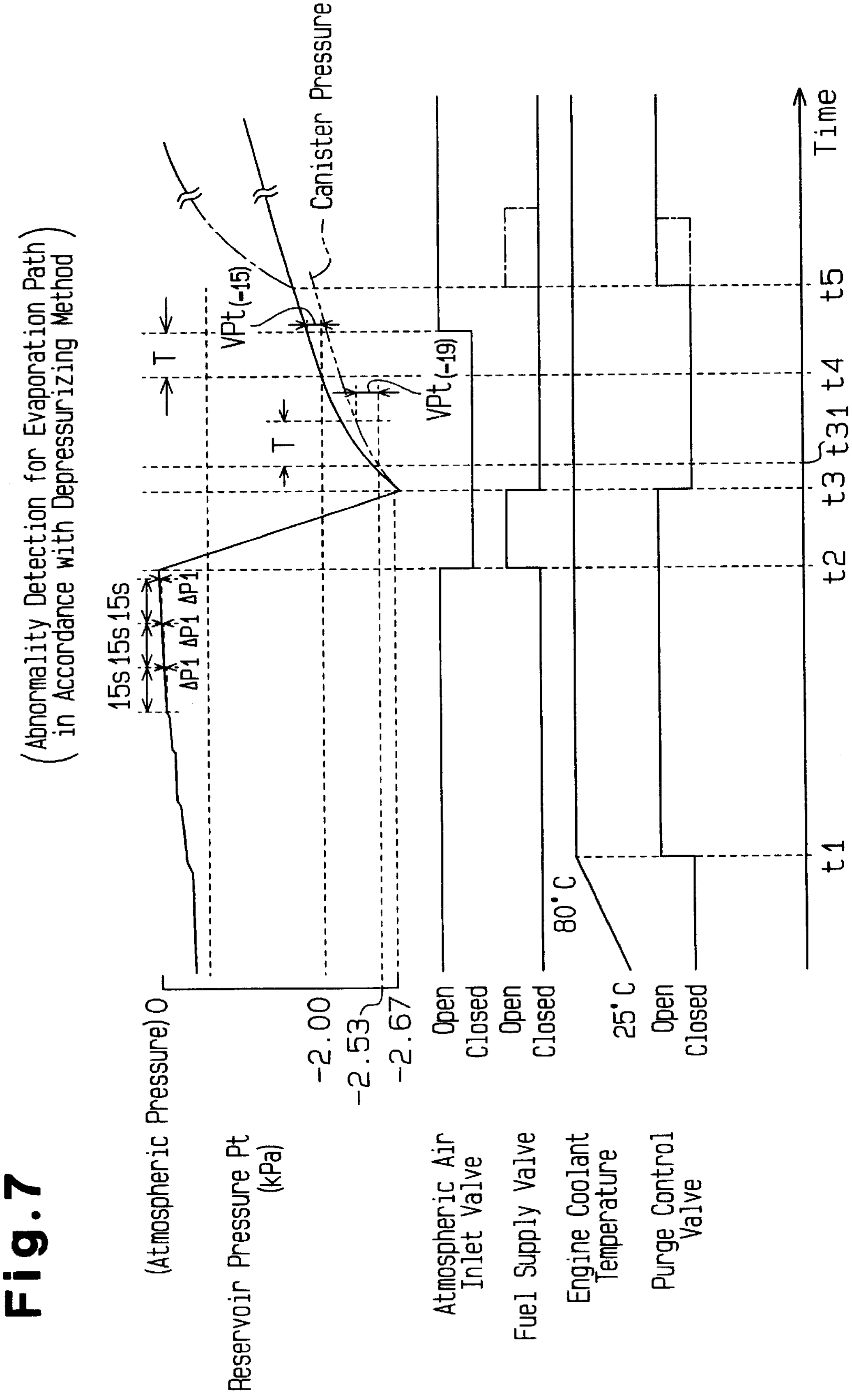
FIG. 7 is a timing chart corresponding to the abnormality detection procedure for the fuel reservoir in accordance with a depressurizing method.

Steps 111 to 123 schematically show an abnormality detection procedure for the evaporation path in accordance with a depressurizing method. More specifically, steps 111 to 119 correspond to an abnormality detection procedure for the fuel reservoir 20, and steps 120 to 123 correspond to an abnormality detection procedure for the canister line. Further, FIG. 7 shows a timing chart that corresponds to the abnormality detection procedure for the evaporation path.

At step 111, the ECU instructs the fuel vapor purge system to start purging fuel vapor. More specifically, the ECU opens the purge control valve 34*a* while opening the atmospheric air inlet valve 35*a* (as indicated at time t1 of FIG. 7). In this state, the fuel supply valve 60 and the pressure releasing valve 73 are both closed. Subsequently, at step 112, the ECU judges if the reservoir pressure Pt, or the pressure in the fuel reservoir 20, is stable. That is, for example, a change ΔP1 in the reservoir pressure Pt, which is detected by the first pressure sensor 31, during a predetermined time period (for example, fifteen seconds) is measured, as shown in FIG. 7. The ECU judges whether or not the measured value, or the reservoir pressure change ΔP1, is equal to or smaller than a predetermined value. If the judgement is positive for three consecutive measurement cycles of the changes ΔP1, the ECU determines that the reservoir pressure Pt is stable. If this is the case, the ECU proceeds to step 113. If not, or if the ECU determines that the reservoir pressure Pt is unstable, the ECU performs step 132.

After confirming that the reservoir pressure Pt is stable, negative pressure is applied to the entire evaporation path, which includes the fuel reservoir 20 and the canister 40, at step 113. More specifically, the ECU closes the atmospheric air inlet valve 35*a* and opens the fuel supply valve 60 while opening the purge control valve 34*a* (as indicated at time t2 in FIG. 7). The canister 40 is thus blocked from the atmospheric air, and negative pressure is applied from the intake passage 12 to the canister 40 through the purge line 34. Further, since the fuel supply valve 60 is open, negative pressure acts in the fuel reservoir 20, the vapor passage 33, the canister 40, and the purge line 34 (that is, the entire evaporation path), thus lowering the reservoir pressure Pt. The pressure in the entire evaporation path is detected by the first pressure sensor 31 attached to the fuel reservoir 20 (and/or the second pressure sensor 32 attached to the canister 40).

The ECU monitors whether the reservoir pressure Pt falls to a predetermined target level (for example, −2.67 kPa=−20 mmHg) (at step 114). If the ECU determines that the reservoir pressure Pt has reached the target level, or whether the judgement of step 114 is positive, the ECU closes the fuel supply valve 60 and the purge control valve 34*a* at step 115 (as indicated by time t3 in FIG. 7). When the fuel supply valve 60 is closed, the fuel reservoir 20 is sealed in a negative pressure state. Likewise, when the purge control valve 34*a* is closed, the canister line is sealed in a negative pressure state.

In this state, if the fuel reservoir 20 has no abnormalities, such as a puncture or rupture, the reservoir pressure Pt slowly approaches (increases toward) a value determined in accordance with equilibrium between the pressure of the air in the reservoir 20 and the pressure of the fuel vapor generated in the reservoir 20. However, if the fuel reservoir 20 has an abnormality that causes leakage, the reservoir pressure Pt rapidly approaches the atmospheric pressure. That is, after a time t3 in FIG. 7, the reservoir pressure Pt rises regardless whether there is leakage from the fuel reservoir 20. However, the rate at which the reservoir pressure Pt rises varies depending on whether or not the fuel reservoir 20 has an abnormality such as a puncture or rupture. Accordingly, at step 116 of this embodiment, the rate of increase of the reservoir pressure Pt, or reservoir pressure change rate $Vpt_{(-15)}$ (with the units of kPa/second or mmHg/second), is measured at time t4, at which the reservoir pressure Pt reaches a predetermined level p1 (which is, for example, −2.00 kPa=−15 mmHg). More specifically, when a predetermined time T (for example, five seconds) elapses after time t4, the reservoir pressure Pt is measured, and the result is a pressure p2. The rate of change in the reservoir pressure $Vpt_{(-15)}$ during this predetermined time T is then computed by the following equation:

$$Vpt_{(-15)}=(p2-p1)/T.$$

The ECU judges whether the fuel reservoir 20 has an abnormality such as a puncture or rupture based on the resulting reservoir pressure change rate $Vpt_{(-15)}$. More specifically, at step 117, the ECU judges whether or not the reservoir pressure altering speed $Vpt_{(-15)}$ is equal to or greater than a predetermined threshold value β (β>0). If the judgement of step 117 is negative, the ECU proceeds to step 118 and determines that the fuel reservoir 20 has no abnormality such as a puncture or rupture. In contrast, if the judgement of step 117 is positive, the ECU proceeds to step 119 and determines that the fuel reservoir 20 includes an abnormality such as a puncture or rupture.

Further, the volume of the canister 40 is relatively small, and the amount of the vapor generated in the canister 40 is also relatively small. Thus, if the canister line has no abnormalities, the pressure in the canister 40, or canister pressure Pc, is not changing rapidly (that is, the canister pressure Pc is rising slowly). However, if there is a leak in the canister line, the canister pressure Pc rapidly approaches the atmospheric pressure.

Accordingly, at step 120 of this embodiment, the rate of increase of the canister pressure Pc, or canister pressure change rate $Vpt_{(-19)}$ (indicated with the units kPa/second or mmHg/second), is measured at time t31, at which the canister pressure Pc reaches a predetermined level p3 (which is, for example, −2.53 kPa=−19 mmHg). More specifically, when the predetermined time T (for example, five seconds) elapses after time t31, the canister pressure Pc is measured as a pressure p3. The rate of change of the canister pressure $Vpt_{(-19)}$ during the predetermined time T is then computed by the following equation:

$$Vpt_{(-19)}=(p3-p1)/T.$$

The ECU judges whether the canister line includes an abnormality such as a puncture or rupture based on the resulting canister pressure change rate $Vpt_{(-19)}$. More specifically, at step 121, the ECU judges whether the canister pressure change rate $Vpt_{(-19)}$ is equal to or greater than a predetermined threshold value γ (γ>0). If the judgement of step 121 is negative, the ECU proceeds to step 122 and determines that the canister line has no abnormality such as a puncture or rupture. In contrast, if the judgement of step 121 is positive, the ECU proceeds to step 123 and determines that the canister line has an abnormality such as a puncture or rupture.

After completing the determination of steps 122 or 123, the ECU terminates the abnormality detection routine shown in FIGS. 5 and 6. If the ECU determines, in step 119, that the fuel reservoir 20 has an abnormality, a warning lamp is illuminated or a warning beeper is activated to warn the driver of the abnormality. Further, if the ECU determines, in step 123, that the canister line has an abnormality, the driver is warned of the abnormality through a similar operation.

If the ECU determines that the fuel reservoir 20 does not have an abnormality in step 104, the ECU performs step 131 and the subsequent steps. That is, the ECU performs an abnormality detection procedure for the canister line, which does not include the fuel reservoir 20.

Figure 8:
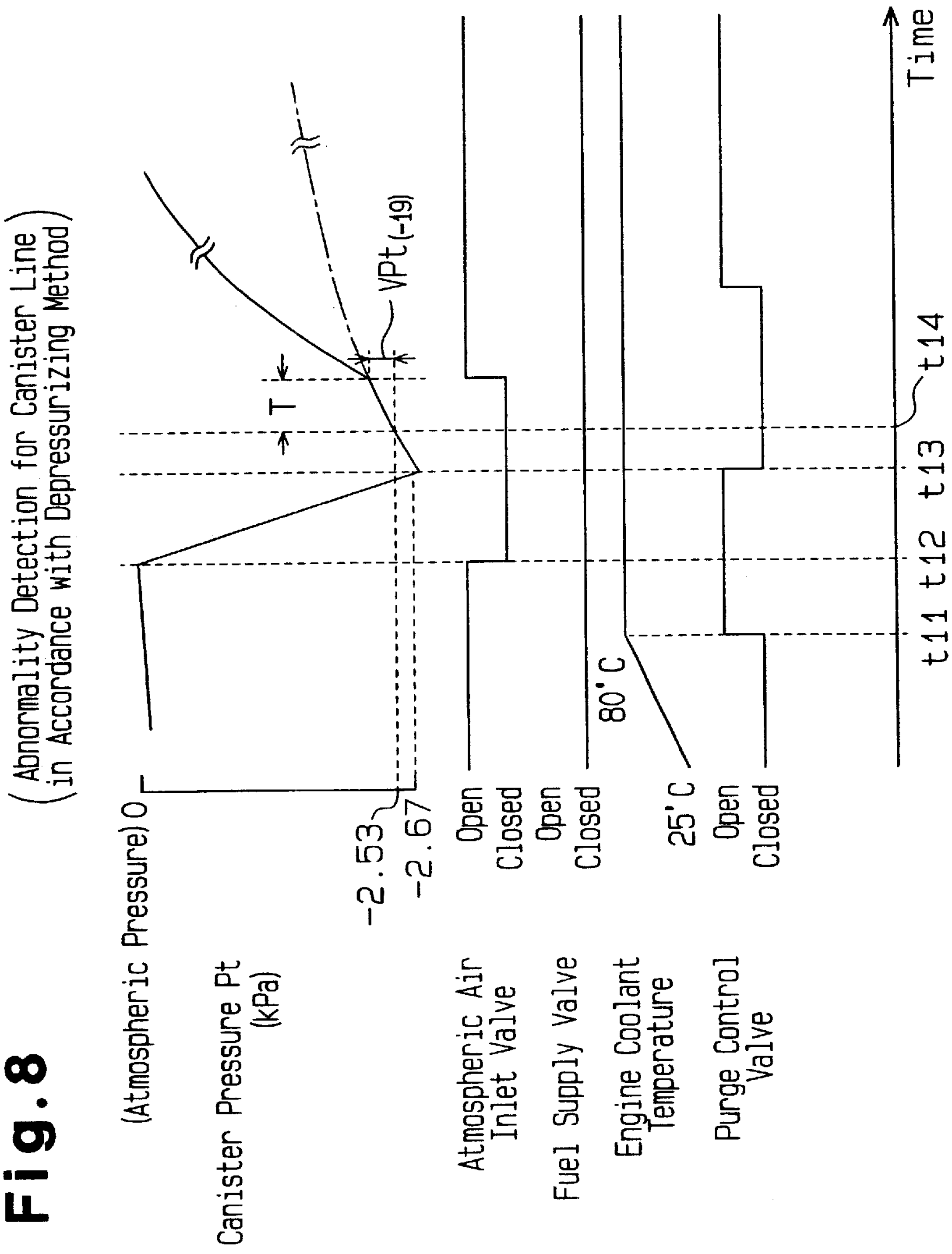
FIG. 8 is a timing chart corresponding to the abnormality detection procedure for a canister line in accordance with a depressurizing method.

Steps 131 to 134 and steps 120 to 123 schematically show an abnormality detection procedure for the canister line in accordance with a depressurizing method. FIG. 8 shows a timing chart that corresponds to this abnormality detection procedure for the canister line.

First, if the coolant temperature of the engine 10 is equal to or greater than a purge initiating level (in this embodiment, 80 degrees Celsius), the ECU, at step 131, opens the purge control valve 34*a* while opening the atmospheric air inlet valve 35*a* (as indicated at time t11 in FIG. 8). This enables the fuel vapor purge system to start purging fuel vapor. Since the volume of the canister 40 and the amount of the fuel vapor generated in the canister 40 are both relatively small, as aforementioned, it is unnecessary to consider whether the pressure in the canister 40, or the canister pressure Pc, is stable.

Subsequently, at step 132, the ECU closes the atmospheric air inlet valve 35*a* while opening the purge control valve 34*a* and closing the fuel supply valve 60 (as indicated at time t12 in FIG. 8). This blocks the canister 40 from the atmospheric air, and negative pressure is applied from the intake passage 12 to the canister line through the purge line 34. The pressure in the canister line is detected by the second pressure sensor 32 attached to the canister 40.

Meanwhile, at step 133, the ECU monitors whether the canister pressure Pc is lowered to a predetermined target level (which is, for example, −2.67 kPa=20 mmHg). When the ECU determines that the canister pressure Pc reaches the target level, or if the judgement of step 133 is positive, the ECU closes the purge control valve 34*a* at step 134 (as indicated by time t13 in FIG. 8). Since the fuel supply valve 60 is closed, the canister line is sealed in a negative pressure state when the purge control valve 34*a* is closed.

As mentioned, the amount of fuel vapor generated in the canister 40 is relatively small. Thus, if the canister line does not have an abnormality such as a puncture or rupture, the pressure in the canister 40, or the canister pressure Pc, does not change rapidly (that is, the canister pressure Pc rises slowly). However, if the canister line has an abnormality such as a puncture or rupture, the canister pressure Pc rapidly approaches the atmospheric pressure. Accordingly, at step 120 of this embodiment, the rate of increase of the canister pressure Pc, or canister pressure change rate $Vpt_{(-19)}$ (with the units kPa/second or mmHg/second), is measured based on time t14 at which the canister pressure Pc reaches the predetermined level p3 (which is, for example, −2.53 kPa=−19 mmHg). More specifically, when the predetermined time T (for example, five seconds) elapses after time t14, the canister pressure Pc is measured, and the result is a pressure p3. The canister pressure change rate $Vpt_{(-19)}$ during the predetermined time T is then computed by the following equation:

$$Vpt_{(-19)}=(p\mathbf{3}-p\mathbf{1})/T.$$

The ECU judges whether the canister line includes an abnormality such as a puncture or rupture based on the resulting canister pressure change rate $Vpt_{(-19)}$. More specifically, at step 121, the ECU judges whether or not the canister pressure change rate $Vpt_{(-19)}$ is equal to or greater than the predetermined threshold value $\gamma$ ($\gamma>0$). If the judgement of step 121 is negative, the ECU proceeds to step 122 and determines that the canister line has no abnormality such as a puncture or rupture. In contrast, if the judgement of step 121 is positive, the ECU proceeds to step 123 and determines that the canister line has an abnormality such as a puncture or rupture.

After completing the determination of steps 122 or 123, the ECU terminates the abnormality detection routine shown in FIGS. 5 and 6. If the ECU determines, in step 123, that the canister line has an abnormality, a warning lamp is illuminated or a warning beeper is activated to warn the driver of the abnormality.

This embodiment has the following advantages.

In the illustrated embodiment, the evaporation path of the fuel vapor purge system includes the fuel reservoir 20 and the canister line that are separable from each other. In other words, the abnormality detection procedure for the fuel reservoir 20 is performed independently from the abnormality detection procedure for the canister line. Accordingly, the abnormality detection procedure for the canister line, in which the amount of the fuel vapor generation is relatively small, is performed quickly. Further, the frequency of performing the abnormality detection procedure for the canister line is increased. In addition, the abnormality detection procedure for the fuel reservoir 20 is performed when the amount of the fuel vapor generated in the reservoir 20 is less than a predetermined value to indicate that the pressure in the reservoir 20 is stable. As a result, the time required for the abnormality detection for the entire fuel vapor purge system is shortened.

As described, in the illustrated embodiment, the abnormality detection procedure for the fuel reservoir 20 is performed separately from the abnormality detection procedure for the canister line. Accordingly, if there is a leak in the fuel vapor purge system, the abnormality detection procedure of the present invention is capable of determining whether the leak is in the fuel reservoir 20 or the canister line.

In the illustrated embodiment, when the atmospheric air inlet valve 35*a* is closed while the purge control valve 34*a* and the fuel supply valve 60 are open, negative pressure is applied from the intake passage 12 to the canister line and the fuel reservoir 20. Afterward, the purge control valve 34*a* is closed to seal the canister line, and the fuel supply valve 60 is closed to seal the fuel reservoir 20. In this manner, a pressure difference is easily generated between the canister line and the fuel reservoir 20.

In the illustrated embodiment, a first cycle of the abnormality detection procedure for the fuel vapor purge system, which is directed specifically to the fuel reservoir 20 of the evaporation path, is rapidly completed immediately after the engine is started.

Further, if the engine 10 is started when cold, an abnormality of the fuel reservoir 20 can be excluded with high reliability at a relatively early stage after the engine 10 is started, based on comparison between the absolute value of the (current) pressure in the fuel reservoir 20 and the reference value $\alpha$ ($\alpha>0$). In other words, the abnormality detection procedure for the fuel reservoir 20 is rapidly completed simply by referring to the reservoir pressure Pt, which is detected by the first pressure sensor 31, before (without) operating any valves (particularly, the fuel supply valve 60) of the fuel vapor purge system. The abnormality detection procedure for the fuel reservoir 20 is thus completed before the abnormality detection procedure for the remainder of the evaporation path is started. This increases the reliability of the fuel vapor purge system. Further, the subsequent steps of the abnormality detection routine for the evaporation path of the system are easily executed.

The fuel supply valve 60 is operated to separate the fuel reservoir 20 from the remainder of the evaporation path, which is the canister line. In this manner, the abnormality detection procedure for the fuel reservoir 20 is performed independently from the abnormality detection procedure for the canister line. Since the volume of the canister 40 and the amount of the vapor generated in the canister 40 are both relatively small, the pressure in the canister 40, or the canister pressure Pc, does not greatly change if the canister line does not have an abnormality. Thus, a reference value for the detection procedure is selected appropriately such that the abnormality detection procedure is performed in relation to the amount of the fuel vapor generated in the canister 40.

It should be apparent to those skilled in the art that the present invention may be embodied in may other specific forms without departing from the sprit or scope of the invention. Particularly, it should be understood that the invention may be embodied in the following forms.

In the illustrated embodiment, steps 102, 103, and 104 of FIG. 5 are executed after the engine 10 is started when cold. However, the abnormality detection routine may be modified such that these steps 102, 103, and 104 are executed before the engine 10 is started.

The fuel vapor purge system according to the present invention does not necessarily have to include the second pressure sensor 32, which is otherwise attached to the canister 40. Further, even if the fuel vapor purge system includes a pair of pressure monitoring points, one of which is located in the fuel reservoir 20 while the other is located in the canister 40, these points may be monitored by a single sensor. If this is the case, a three-directional valve is located among the pressure sensor and the pressure monitoring points. The three-directional valve is operated to connect the pressure sensor selectively to the pressure monitoring point in the fuel reservoir 20 and the pressure monitoring point in the canister 40.

In the illustrated embodiment, the abnormality detection procedure for the entire evaporation path, which includes the fuel reservoir 20 and the canister line, is performed in accordance with a depressurizing method. However, the abnormality detection procedure may be performed in accordance with a pressurizing method, instead of the depressurizing method. In this case, the abnormality detection procedure first pressurizes a region of the evaporation path subjected to the detection. Subsequently, pressure change in the subject region of the evaporation path is monitored to judge whether or not the region has an abnormality.

Therefore, the present examples and embodiments are to be considered as illustrative and not restrictive and the invention is not to be limited to the details given herein, but may be modified within the scope and equivalence of the appended claims.

What is claimed is:

1. A method for detecting an abnormality in a fuel vapor purge system, which has a line that connects an intake passage of an engine to a fuel reservoir and a canister inlet valve, wherein the canister inlet valve is located between the fuel reservoir and a canister to be selectively opened and closed by interlocking with a fuel lid, wherein the method comprises:

measuring pressure in the fuel reservoir that is sealed by closing the canister inlet valve after the engine is started when cold or before the engine is started;

comparing an absolute value of a difference between the pressure in the fuel reservoir and the atmospheric pressure with a predetermined reference value;

judging whether or not the fuel reservoir has an abnormality from the comparison; and performing an abnormality detection procedure for the fuel vapor purge system with negative pressure applied from the intake passage to the line of the fuel vapor purge system if it is determined that the fuel reservoir has an abnormality.

2. The method as set forth in claim 1, wherein it is determined that the fuel reservoir does not have an abnormality if the absolute value of the difference between the pressure in the fuel reservoir and the atmospheric pressure is equal to or greater than the predetermined reference value.

3. An apparatus for detecting an abnormality in a fuel vapor purge system, which has a line that connects an intake passage of an engine to a fuel reservoir and a canister inlet valve, wherein the canister inlet valve is located between the fuel reservoir and a canister to be selectively opened and closed by interlocking with a fuel lid, wherein the apparatus comprises:

a measurement device for measuring pressure in the fuel reservoir; and a control device for controlling an open/close operation of the canister inlet valve and for obtaining information regarding the pressure in the fuel reservoir from the measurement device, wherein the control device obtains the information regarding the pressure in the fuel reservoir from the measurement device while the reservoir is sealed by closing the canister inlet valve, compares the absolute value of the difference between the pressure in the fuel reservoir and the atmospheric pressure with a predetermined reference value, and judges whether or not the fuel reservoir has an abnormality in accordance with the comparison.

4. The apparatus as set forth in claim 3, wherein it is determined that the fuel reservoir does not have an abnormality such as a leak if the absolute value of the difference between the pressure in the fuel reservoir and the atmospheric pressure is equal to or greater than the predetermined reference value.

5. The apparatus as set forth in claim 3, wherein the control device instructs the measurement device to measure the pressure in the fuel reservoir after the engine is started when cold or before the engine is started.

6. The apparatus as set forth in claim 3, wherein the line includes:

a canister;

a purge line, which connects the canister to the intake passage of the engine; and a vapor passage, which connects the canister to the fuel reservoir, wherein the canister inlet valve is located in the vapor passage.

7. A method for detecting an abnormality in a fuel vapor purge system, which sends fuel vapor generated in a fuel reservoir to a canister through a vapor passage provided with a canister inlet valve and which purges the fuel vapor from the canister to an intake passage of an engine through a purge line, wherein the canister inlet valve is selectively opened and closed by interlocking with a fuel lid, wherein the method comprises:

separating the fuel reservoir from a canister line, which does not include the fuel reservoir, by closing the canister inlet valve, after the engine is started when cold or before the engine is started, wherein the canister line includes the vapor passage, the canister, and the purge line;

measuring pressure in the fuel reservoir while the reservoir is sealed and while a pressure difference exists between the interior of the fluid reservoir and the exterior of the fluid reservoir for detecting the abnormality in the fluid reservoir in accordance with a change of the pressure in the fluid reservoir; and measuring pressure in the canister line while the canister line is sealed and while a pressure difference exists between the interior of the canister line and the exterior of the canister line for detecting an abnormality in the canister line in accordance with a change of the pressure in the canister line;

independently performing an abnormality detection for the canister line.

8. The method as set forth in claim 7, further comprising:

applying pressure from a pressure source to the canister line while the canister inlet valve is open to supply pressure from the pressure source to the fuel reservoir such that a pressure difference is generated between the interior of the canister line and the interior of the fuel reservoir; and subsequently closing the canister inlet valve to seal the fuel reservoir while the pressure source is blocked to seal the canister line.

9. An abnormality detection apparatus incorporated in a fuel vapor purge system, which sends fuel vapor generated in a fuel reservoir to a canister through a vapor passage provided with a canister inlet valve and purges the fuel vapor from the canister to an intake passage of an engine through a purge line, wherein the canister inlet valve is selectively opened and closed by interlocking with a fuel lid, wherein the apparatus comprises:

a canister line, which includes the vapor passage, the canister, and the purge line;

a first measurement device for measuring the pressure in the fuel reservoir;

a second measurement device for measuring the pressure in the canister line; and a control device for controlling an open/close operation of the canister inlet valve and for obtaining information regarding the pressure in the fuel reservoir from the first measurement device while obtaining information regarding the pressure in the canister line from the second measurement device, wherein the control device:

closes the canister inlet valve to seal the fuel reservoir and to isolate the reservoir from the canister line and creates a pressure difference between the interior of the fuel reservoir and the exterior of the fuel reservoir and seals the canister line and creates a pressure difference between the interior of the canister line and the exterior of the canister line; and obtains the pressure in the fuel reservoir from the first measurement device while the reservoir is sealed to detect an abnormality of the fuel reservoir in accordance with a change in the pressure in the fuel reservoir while obtaining the pressure in the canister line from the second measurement device while the canister line is sealed to detect an abnormality of the canister line in accordance with a change in the pressure in the canister line.

10. The apparatus as set forth in claim 9, wherein the control device:

supplies pressure from a pressure source to the canister line while opening the canister inlet valve to apply the pressure from the pressure source to the fuel reservoir such that a pressure difference is generated between the interior of the canister line and the interior of the fuel reservoir; and subsequently seals the fuel reservoir by closing the canister inlet valve while sealing the canister line by blocking the pressure source.

11. The apparatus as set forth in claim 9, wherein:

the canister includes an atmospheric air inlet line, which applies atmospheric air to the canister, and an atmospheric air inlet valve, which is located in the atmospheric air inlet line; and the canister inlet valve is a fuel supply valve that is located in the vapor passage.

12. An abnormality detection apparatus incorporated in a fuel vapor purge system, which sends fuel vapor generated in a fuel reservoir to a canister through a vapor passage provided with a canister inlet valve and purges the fuel vapor from the canister to an intake passage of an engine through a purge line, wherein the canister inlet valve is selectively opened and closed by interlocking with a fuel lid, wherein the apparatus comprises:

a canister line, which includes the vapor passage, the canister and the purge line;

a first measurement device for measuring the pressure in the fuel reservoir;

a second measurement device for measuring the pressure in the canister line; and a control device for controlling an open/close operation of the canister inlet valve, wherein the control device obtains information regarding the pressure in the fuel reservoir from the first measurement device and information regarding the pressure in the canister line from the second measurement device, and wherein the control device:

obtains information regarding the pressure in the fuel reservoir sealed by closing the canister inlet valve and detects an abnormality of the fuel reservoir according to the obtained information regarding the pressure in the fuel reservoir;

when determining that the fuel reservoir does not have an abnormality, applies negative pressure only to the canister line and performs an abnormality detection procedure for the canister line in accordance with a change of the pressure in the canister line; and when determining that the fuel reservoir has an abnormality, seals the canister line and the fuel reservoir after applying negative pressure to the canister line and the fuel reservoir, and performs an abnormality detection procedure independently for the canister line and the fuel reservoir in accordance with a change of the pressure in the canister line and the reservoir.

13. The apparatus as set forth in claim 12, wherein it is determined that the fuel reservoir does not have an abnormality such as a leak if the absolute value of the difference between the pressure in the fuel reservoir and the atmospheric pressure is equal to or greater than a predetermined reference value.

14. The apparatus as set forth in claim 12, wherein the control device instructs the first measurement device to measure the pressure in the fuel reservoir sealed by closing the canister inlet valve after the engine is started when cold or before the engine is started.

* * * * *